United States Patent
Lin et al.

(10) Patent No.: US 12,554,996 B2
(45) Date of Patent: Feb. 17, 2026

(54) REDUCTION OF NODES FOR A GRAPH-BASED KNOWLEDGE SYSTEM VIA DISTRIBUTION MODELS OF DATA

(71) Applicant: International Business Machines Corporation, Armonk, NY (US)

(72) Inventors: June-Ray Lin, Taipei (TW); Ying-Chen Yu, Taipei (TW); Yi-Chun Tsai, Taipei (TW); Pei-Hua Su, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1110 days.

(21) Appl. No.: 17/331,540

(22) Filed: May 26, 2021

(65) Prior Publication Data
US 2022/0383140 A1    Dec. 1, 2022

(51) Int. Cl.
G06N 5/02        (2023.01)
G06F 16/901      (2019.01)
G06F 17/18       (2006.01)

(52) U.S. Cl.
CPC ........... G06N 5/02 (2013.01); G06F 16/9024 (2019.01); G06F 17/18 (2013.01)

(58) Field of Classification Search
CPC ...... G06N 5/02; G06N 5/022; G06F 16/9024; G06F 17/18
See application file for complete search history.

(56) References Cited

U.S. PATENT DOCUMENTS

| | | | |
|---|---|---|---|
| 7,685,554 B1 * | 3/2010 | Kelly | G06F 30/327 703/22 |
| 7,689,585 B2 * | 3/2010 | Zeng | G06F 16/9532 707/999.104 |
| 9,342,623 B2 | 5/2016 | Narayanan et al. | |
| 9,787,705 B1 * | 10/2017 | Love | G06F 16/9024 |
| 10,084,804 B2 | 9/2018 | Kapadia et al. | |
| 10,572,522 B1 * | 2/2020 | Goyal | G06N 5/022 |
| 10,609,059 B2 | 3/2020 | Apostolopoulos | |
| 10,922,407 B2 | 2/2021 | Lin et al. | |
| 11,816,618 B1 * | 11/2023 | Cheek, Jr. | G06T 3/40 |
| 2007/0116267 A1 * | 5/2007 | Speirs, II | H04L 9/06 380/28 |
| 2017/0063909 A1 | 3/2017 | Muddu et al. | |
| 2017/0063910 A1 | 3/2017 | Muddu et al. | |
| 2017/0177711 A1 * | 6/2017 | Thomas | G06F 16/1805 |

(Continued)

OTHER PUBLICATIONS

Bonifati A, Dumbrava S, Kondylakis H. Graph summarization. arXiv preprint arXiv:2004.14794. Apr. 30, 2020. (Year: 2020).*

(Continued)

*Primary Examiner* — Brent Johnston Hoover
(74) *Attorney, Agent, or Firm* — KONRAD, RAYNES, DAVDA & VICTOR LLP; Rabindranath Dutta

(57) ABSTRACT

A computational device generates a graph data structure comprising a plurality of inductive nodes having a plurality of attributes. The plurality of inductive nodes are clustered into a plurality of groupings based on the plurality of attributes. A substitution is made of more than one inductive node with a single distribution node that represents characteristics of the more than one inductive node based on distribution models of attributes included in the plurality of groupings.

18 Claims, 11 Drawing Sheets

(56) References Cited

U.S. PATENT DOCUMENTS

| | | | |
|---|---|---|---|
| 2018/0101144 A1* | 4/2018 | Füger | G06F 11/3013 |
| 2018/0101800 A1* | 4/2018 | Lecue | G06Q 10/06311 |
| 2018/0165475 A1* | 6/2018 | Veeramachaneni | |
| | | | G06F 21/6254 |
| 2019/0079994 A1* | 3/2019 | Ma | G06F 16/2379 |
| 2019/0102155 A1* | 4/2019 | Garvey | G06F 8/61 |
| 2019/0295721 A1* | 9/2019 | Madabhushi | G06N 3/08 |
| 2020/0125727 A1 | 4/2020 | Wu et al. | |
| 2020/0358796 A1* | 11/2020 | Kundu | G06N 3/045 |

OTHER PUBLICATIONS

Qin KK, Salim FD, Ren Y, Shao W, Heimann M, Koutra D. G-crewe: Graph compression with embedding for network alignment. InProceedings of the 29th ACM International Conference on Information & Knowledge Management Oct. 19, 2020 (pp. 1255-1264). (Year: 2020).*

Valverde S, Corominas-Murtra B, Perna A, Kuntz P, Theraulaz G, Solà © RV. Percolation in insect nest networks: evidence for optimal wiring. Physical Review EâStatistical, Nonlinear, and Soft Matter Physics. Jun. 2009;79(6):066106. (Year: 2009).*

Rossi RA, McDowell LK, Aha DW, Neville J. Transforming graph data for statistical relational learning. Journal of Artificial Intelligence Research. Oct. 30, 2012;45:363-441. (Year: 2012).*

Chen F, Wang YC, Wang B, Kuo CC. Graph representation learning: a survey. APSIPA Transactions on Signal and Information Processing. Jan. 2020;9:e15. (Year: 2020).*

Song Q, Wu Y, Lin P, Dong LX, Sun H. Mining summaries for knowledge graph search. IEEE Transactions on Knowledge and Data Engineering. Feb. 22, 2018;30(10):1887-900. (Year: 2018).*

Liu Y, Safavi T, Dighe A, Koutra D. Graph summarization methods and applications: A survey. ACM computing surveys (CSUR). Jun. 22, 2018;51(3):1-34. (Year: 2018).*

Boumans, "Graph-based inductive reasoning", Jun. 11, 2016, Studies in History and Philosophy of Science Part A, vol. 59, Oct. 2016, pp. 1-10. (Year: 2016).*

Wei et al., "MSD-Kmeans: A Novel Algorithm for Efficient Detection of Global and Local Outliers" (online) retrived from the Internet on May 14, 2021 at URL>https://arxiv.org/abs/1910.06588. Total 5 pages.

Liu, "Reducing Large Graphs to Small Supergraphs: A Unified Approach" dated Mar. 2018, (online) retrieved from the Internet at URL>https://link.springer.com/article/10.1007/s13278-018-0491-4, Total 14 pages.

Teru "Inductive Relation Prediction by Subgraph Reasoning" dated Feb. 2020, (Online) retrieved from the Internet at URL>https://www.semanticscholar.org/paper/Inductive-Relation-Prediction-by-Subg,,, Total 13 pages.

Noble, "Graph-Based Anomaly Detection" dated Aug. 2003, (online) retrieved from the Internet at URL> https://dl.acm.org/doi/10.1145/956750.956831, Total 6 pages.

Rossi et al., "Transforming Graph Data for Statistical Relational Learning" dated Sep. 2012, (online) retrieved from the Internet at URL>Transforming graph data for statistical relational learning, Total 79 pages.

Sachan, "Knowledge-Graph Embedding Compression" dated Jul. 2020, (online) retrieved from the Internet at URL>https://www.aclweb.org/anthology/2020.acl-main.238/, Total 11 pages.

Wahyudi et al. "Knowledge-based Graph Compression Using Graph Property on Yago" dated Jan. 15, 2018, (online) retrieved from the Internet at URL>https://ieeexplore.ieee.org/document/8257097, Total 6 pages.

Ting et al., "Compression Analytics for Classification and Anomaly Detection Within Network Communication" dated Oct. 26, 2018, (online) retrieved from the Internet at URL>https://ieeexplore.ieee.org/document/8510887, Total 12 pages.

US Patent Application, dated Mar. 8, 2020, for U.S. Appl. No. 16/812,743 "Methods and Systems for Graph Computing with Hybrid Reasoning", Total 51 pages.

Clustering Algorithms, Machine Learning, 05 pages, May 27, 2025, https://developers.google.com/machine-learning/clustering/clustering-algorithms.

Seif George. "The 5 Clustering Algorithms Data Scientists Need to Know", Towards Data Science, Feb. 5, 2018, 9 pages.

* cited by examiner

REDUCTION OF NODES FOR A GRAPH-BASED KNOWLEDGE SYSTEM VIA DISTRIBUTION MODELS OF DATA

BACKGROUND

1. Field

Embodiments relate to the reduction of nodes for a graph-based knowledge system via distribution models of data.

2. Background

Knowledge representation and reasoning are important issues in artificial intelligence, and the development of effective mechanisms for representing knowledge is a central aspect of intelligent systems implemented via computational systems.

Graphs are simple mathematical objects with nodes and edges that connect nodes, and such graphs may be visualized easily. In artificial intelligence, graph-based knowledge representation may comprise a reasoning model in which many different types of knowledge (e.g., ontology, rules, constraints, and facts) are represented in labeled graphs with nodes and edges. The labeled graphs provide an intuitive and easily understandable means to represent knowledge. The reasoning mechanisms may be based on traversal of the nodes and edges of the labeled graphs.

Graph-based knowledge representation may be used for reasoning and for making deductions and inferences in a variety of artificial intelligence and data processing domains such as natural language processing, databases, neural networks, speech analysis, query answering, etc.

SUMMARY OF THE PREFERRED EMBODIMENTS

Provided are a method, system, and computer program product in which a computational device generates a graph data structure comprising a plurality of inductive nodes having a plurality of attributes. The plurality of inductive nodes are clustered into a plurality of groupings based on the plurality of attributes. A substitution is made of more than one inductive node with a single distribution node that represents characteristics of the more than one inductive node based on distribution models of attributes included in the plurality of groupings.

In further embodiments, the graph data structure is converted to a condensed graph data structure used to represent knowledge via the substitution, wherein prediction from the condensed graph data structure is faster in comparison to prediction from the graph data structure.

In yet further embodiments, the computational device is a local computational device, wherein a new observation is received from a remote computational device. The condensed graph data structure is traversed to determine which distribution node encompasses attributes of the new observation, to generate predictions based on the new observation.

In certain embodiments, data received at the local computational device from the remote computational device are in a format unknown to the local computational device, and data types of the plurality of attributes are predicted by the local computational device via patterns and value ranges of the attributes.

In additional embodiments, the plurality of attributes are numeric values, and the single distribution model comprises a normal distribution of the numeric values with a computed mean and a standard deviation from the numeric values.

In yet additional embodiments, the plurality of attributes are dates, and the single distribution model corresponds to a range of dates.

In certain additional embodiments, the graph data structure represents knowledge entities in the plurality of inductive nodes.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Graph-based knowledge representations may represent graphically a very large amount of knowledge in the induction nodes and edges of graphs. The number of nodes in the graph may impact the performance of inference and inductive reasoning systems that are employed on the graph-based knowledge representations. Additionally, in certain graphs, open data (i.e., data in unknown format) may be received from a plurality of external data sources and such data may have to be integrated into any framework that attempts to improve performance for drawing inferences from the graphs.

Certain embodiments predict the data type of open data that is received to generate a statistical distribution of ranges of the data. The graph is then condensed by substituting many inductive nodes into a single distribution node to facilitate the process of rapid drawing of inferences from the graph. As a result, processing speed for managing and drawing inferences and performing inductive reasoning from knowledge graphs is improved in a computational device.

EXEMPLARY EMBODIMENTS

Figure 1:
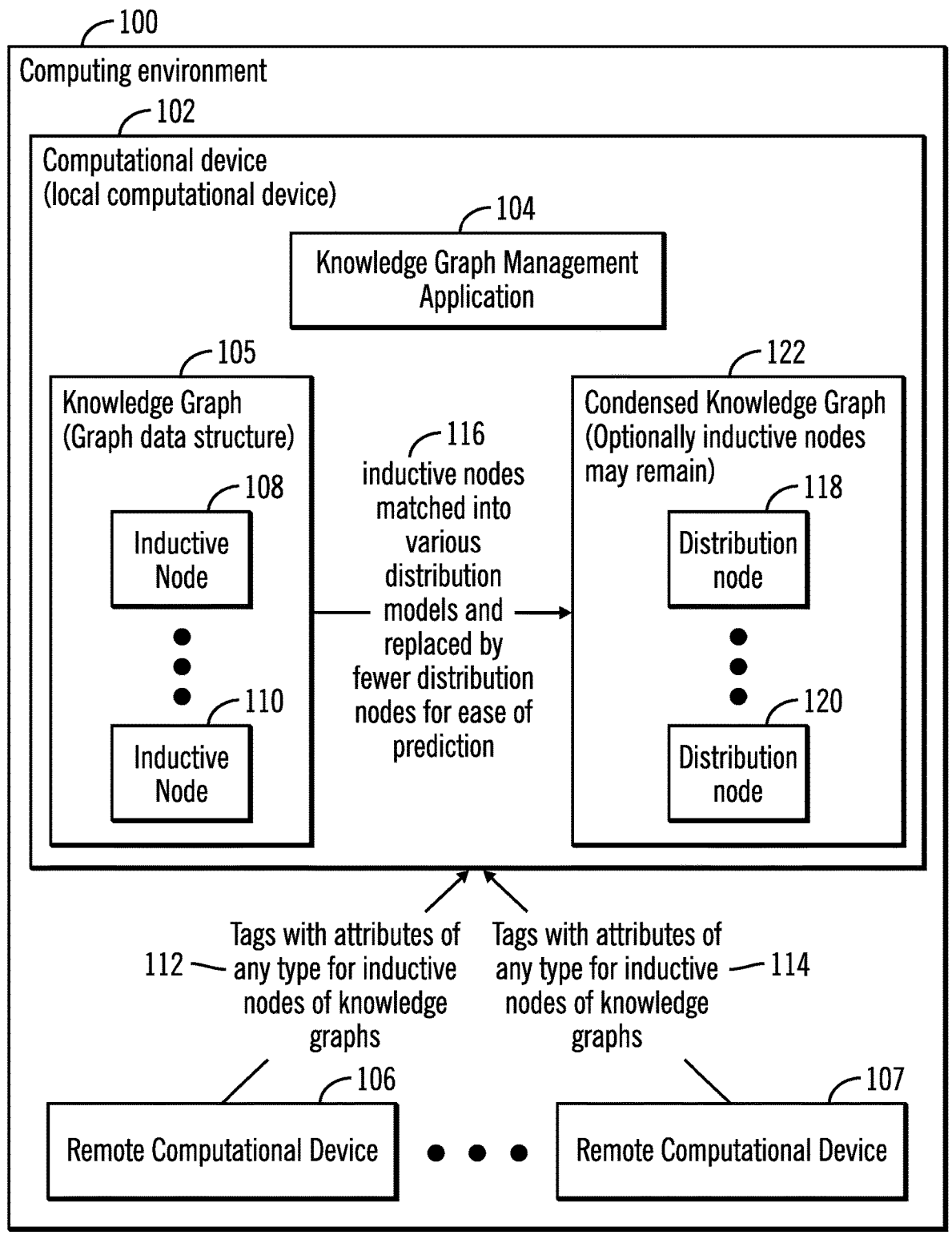
FIG. 1 illustrates a block diagram of a computing environment comprising a local computational device executing a knowledge graph management application, where the local computational device is coupled to a plurality of remote computational devices, in accordance with certain embodiments.

FIG. 1 illustrates a block diagram of a computing environment 100 comprising a local computational device 102 coupled to a plurality of remote computational devices 106, 107, in accordance with certain embodiments. In certain embodiments.

The local computational device 102 and the remote computational devices 106, 107 may comprise any suitable computational device including those presently known in the art, such as, a personal computer, a workstation, a server, a mainframe, a hand held computer, a palm top computer, a telephony device, a network appliance, a blade computer, a processing device, a controller, etc.

The local computational device 102 and the remote computational devices 106, 107 may be elements in any suitable network, such as, a storage area network, a wide area network, the Internet, an intranet, etc. In certain embodiments, local computational device 102 and the remote computational devices 106, 107 may be elements in a cloud computing environment.

A knowledge graph management application 104 executes in the local computational device 102. In certain embodiments, the knowledge graph management application 104 may be implemented in software, hardware, firmware or any combination thereof.

A knowledge graph 105 comprised of a plurality of inductive nodes 108, 110 may be generated in the computational device 102 by the knowledge graph management application 104. The knowledge graph 105 may represent knowledge entities in the inductive nodes 108, 110 and the edges connecting the inductive nodes 108, 110. The inductive nodes 108, 110 allow inductive reasoning to be performed in the knowledge graph 105. Inductive reasoning is a type of inference that involves forming generalizations based on specific instances that have been experienced, observations that have been made, or facts that are known to be true or false.

The local computational device 102 receives tags with attributes of any type of inductive nodes of knowledge graphs (as shown via reference numeral 112, 114) from the remote computational device 106, 107 for building the knowledge graph 105. Different remote computational devices may have different types of tags whose format may not be known in advance to the knowledge graph management application 104 that executes in the computational device 102.

The number of inductive nodes 108, 110 in the knowledge graph 105 may become extremely large in number because of the large amount of information received via the tags 112, 114 from the plurality of remote computational device 106, 107 and traversing such a large number of inductive nodes may be very time consuming for inductive reasoning from the knowledge graph 105.

In order to improve the performance for performing inductive reasoning from the knowledge graph 105, the knowledge graph management application 104 matches the numerous inductive nodes 108, 110 into distribution models and replaces the inductive nodes 108 by a fewer number of distribution nodes 118, 120 (as shown via reference numeral 116). The fewer number of distribution nodes 118, 120 form a condensed knowledge graph 122. In certain embodiments, the inductive nodes 108, 110 may also remain in the condensed knowledge graph 122. In any event, irrespective of whether or not the inductive nodes are retained in the condensed knowledge graph, inductive reasoning may be performed by using the distribution nodes 118, 120 relatively faster in comparison to using the inductive nodes 108, 110. Each distribution node represents a plurality of inductive nodes and may be used instead of the plurality of inductive nodes for inductive reasoning, and as a result the traversal of the condensed knowledge graph 122 is faster in comparison to the traversal of the knowledge graph 105.

Figure 2:
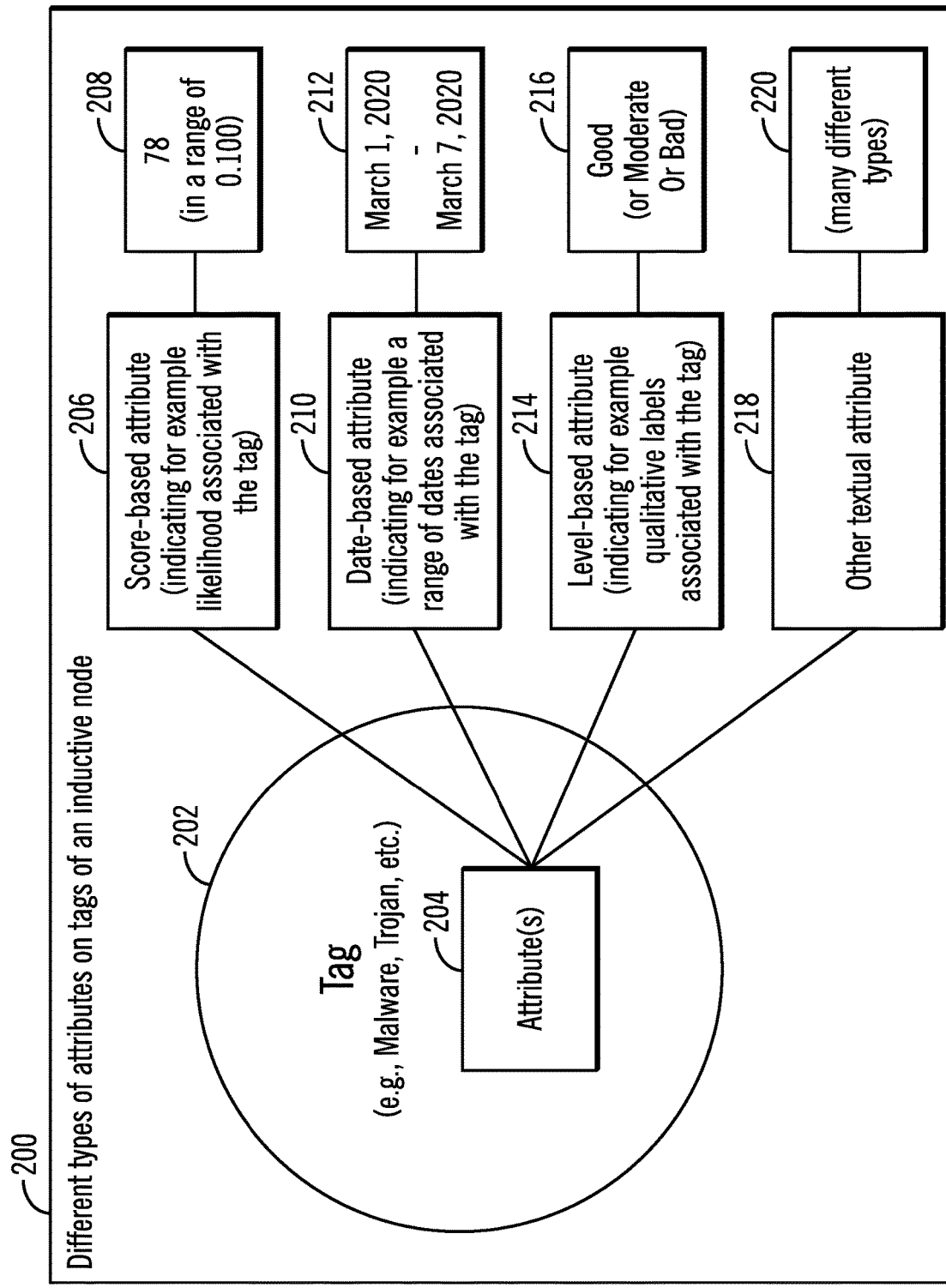
FIG. 2 illustrates a block diagram that shows examples of different types of attributes on tags of an inductive node, in accordance with certain embodiments.

FIG. 2 illustrates a block diagram 200 that shows examples of different types of attributes on tags of an inductive node, in accordance with certain embodiments.

For example, a tag 202 received by the local computational device 102 from the remote computational device 106, 107 may represent a malware, a trojan, or some such element in a computer security management knowledge representation system included in the knowledge graph 105. The tag 202 may include many different types of attributes 204.

In certain embodiments (shown via reference numerals 206, 208), the attribute 204 may be a score-based attribute, where the score indicates a likelihood associated with the tag. For example, the score that indicates a likelihood of a malware may be indicated as a likelihood score of 78, where the likelihood score may be between 0 and 100 with a high likelihood score indicting a higher likelihood of being a malware.

In certain embodiments (shown via reference numerals 210, 212), the attribute 204 may be a date-based attribute, where a range of dates is associated with the tag. For example, the range of dates may be Mar. 1, 2020 to Mar. 7, 2020 to indicate a malware being associated withing the indicated range of dates.

In certain embodiments (shown via reference numerals 214, 216), the attribute 204 may be a level-based attribute, where a qualitative comparative description is associated with the tag. For example, the attribute may be good, moderate or bad.

In certain other embodiments (shown via reference numerals 218, 220), the attribute 204 may be other textual attributes of many different types.

It should be noted that the remote computational devices 106, 107 may generate tags with attributes whose formats may not be known to the knowledge graph management application 104 that executes in the local computational device 102. In certain embodiments, the remote computational devices 106, 107 may be managed by different vendors that provide information from their own knowledge sources to the computational device 102, in response to prior arrangements made by the organization that uses the knowledge graph management application 104 to perform inductive reasoning on the knowledge graph 105 that is built from at least from some information provided by the remote computational devices 106, 107.

Figure 3:
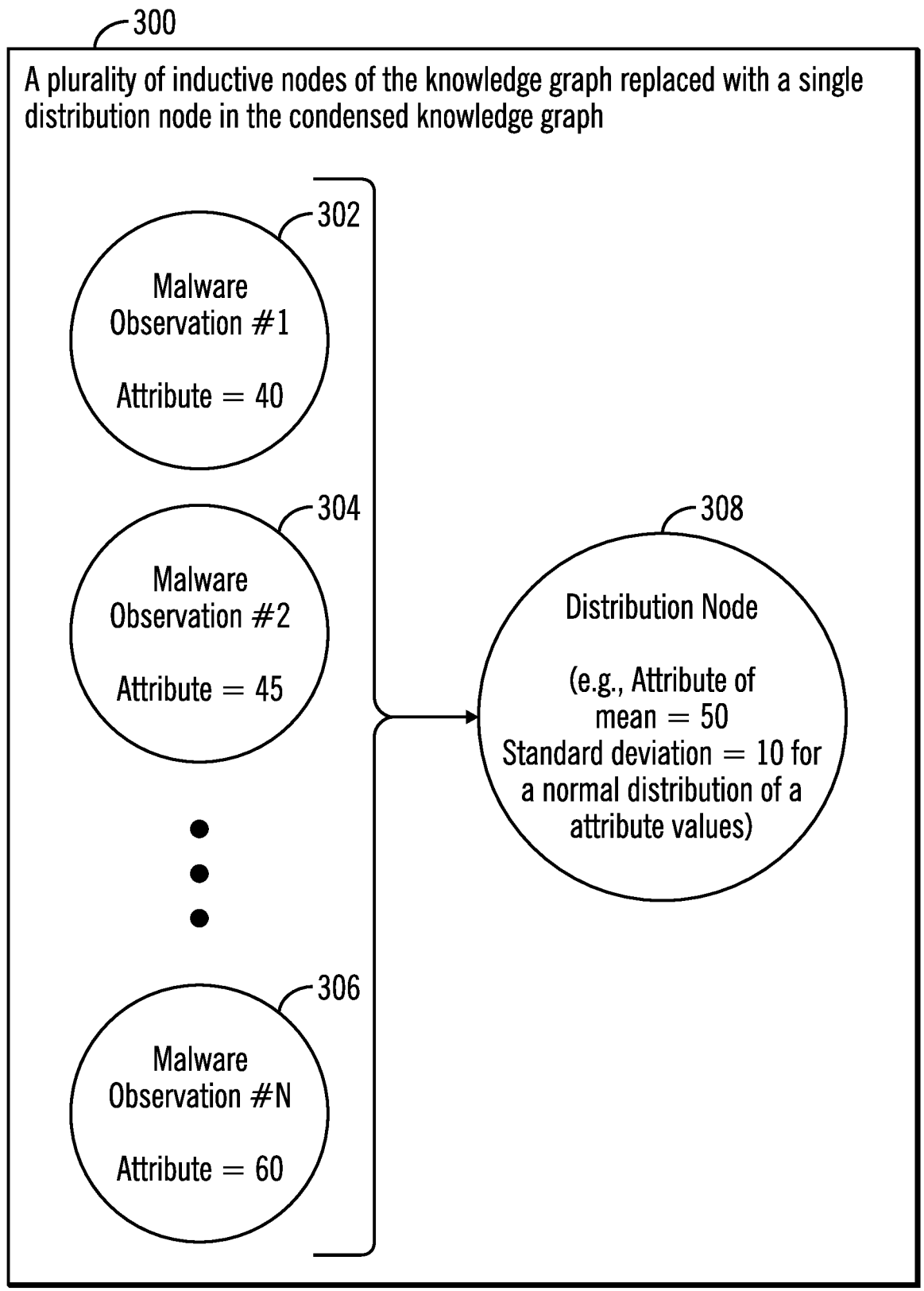
FIG. 3 illustrates a block diagram that shows how a plurality of inductive nodes of a knowledge graph is replaced with a single distribution node in a condensed knowledge graph, in accordance with certain embodiments.

FIG. 3 illustrates a block diagram 300 that shows how a plurality of inductive nodes 302, 304, 306 of a knowledge graph 105 is replaced with a single distribution node 308 in a condensed knowledge graph 122, in accordance with certain embodiments.

In the example shown in FIG. 3, the plurality of inductive nodes 302, 304, 306 represent various malware observations with different numeric attributes. For example, inductive node 302 indicates a malware observation with an attribute of 40, inductive node 304 indicates a malware observation with an attribute of 45, and inductive node 306 indicates a malware observation with an attribute of 60.

The knowledge graph management application 104 condenses the plurality of inductive nodes 302, 304, 306 into a single distribution node 308 that shows the mean and standard deviation of the attributes of the inductive nodes 302, 304, 306. For example, the distribution node 308 may have an attribute with a mean of 50 and a standard deviation of 10 to represent numeric attributes of inductive nodes 302, 304, 306 that fit a normal distribution.

Figure 4:
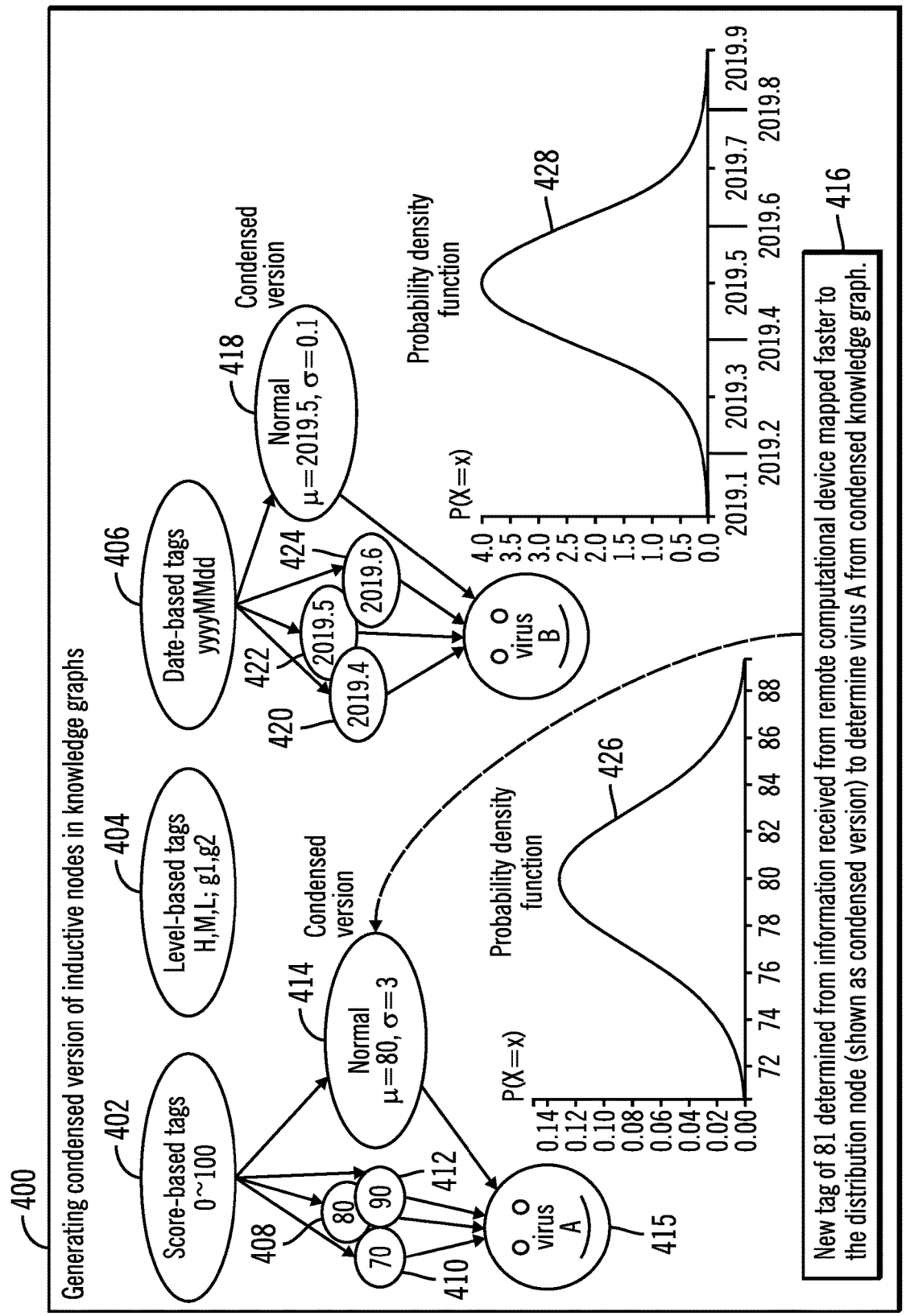
FIG. 4 illustrates a block diagram that shows the generation of condensed version of inductive nodes in knowledge graphs, in accordance with certain embodiments.

FIG. 4 illustrates a block diagram 400 that shows the generation of condensed version of inductive nodes in knowledge graphs, in accordance with certain embodiments.

A plurality of score-based tags 402, level-based tags 404 and data-based tags 406 are shown in FIG. 4. A plurality of representative inductive nodes 408, 410, 412 with various scores are shown, and the condensed version 414 that is a distribution node with a mean score of 80 and a standard deviation of 3 is also shown.

In response to a new tag with a score of 81 determined from information received from a remote computational device, the information is mapped faster to the distribution node 414 (shown as condensed version) to determine virus A 415 from the condensed knowledge graph 122 (as shown via reference numeral 416). This inductive reasoning is much faster because the mapping to the distribution node 414 (shown as condensed version) is faster in comparison to searching though the plurality of inductive nodes 408, 410, 412.

Similarly, distribution node 418 (shown as condensed version) may represent a plurality of inductive nodes 420, 422, 424 with date-based tags and a new tag with a date may be mapped to the distribution node 418 much faster than traversing though the plurality of inductive nodes 420, 422, 424.

While the condensed version of the inductive nodes has been created for certain statistical distributions 426, 428 of scores and dates, other statistical distributions may be used in alternative embodiments.

Figure 5:
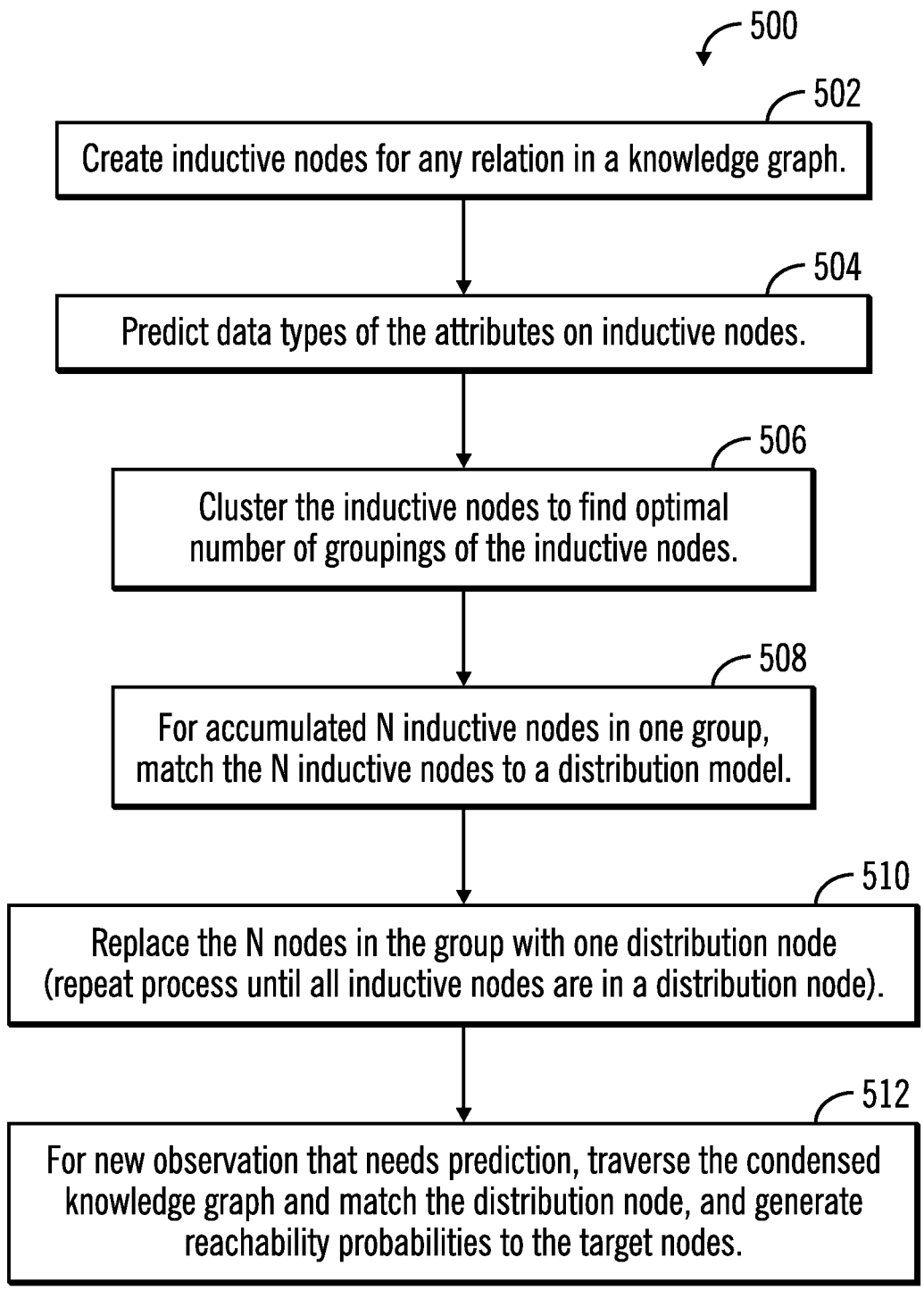
FIG. 5 illustrates a first flowchart that shows operations for the reduction of nodes for a graph-based knowledge system via distribution models of data.

FIG. 5 illustrates a first flowchart 500 that shows operations for the reduction of nodes for a graph-based knowledge system via distribution models of data. The operations shown in FIG. 5 may be performed by the knowledge graph management application 104 that executes in the local computational device 102.

Control starts at block 502 in which the knowledge graph management application 104 creates inductive nodes for any relation in a knowledge graph 105. Control proceeds to block 504 in which the knowledge graph management application 104 predicts or deduces data types of the attributes on inductive nodes, because the data types of data received from the remote computational devices 106, 107 may not to be known without such prediction or deduction.

From block 504 control proceeds to block 506 in which the knowledge graph management application 104 clusters (e.g., by using a clustering mechanism) the inductive nodes to find an optimal number of groupings of the inductive nodes. For accumulated N inductive nodes in one group, the knowledge graph management application 104 matches (at block 508) the N inductive nodes to a distribution model.

The knowledge graph management application 104 replaces (at block 510) the N nodes in the group with one distribution node and the process is repeated until all inductive nodes are in a distribution node). For a new observation that needs prediction, the knowledge graph management application 104 traverses the condensed knowledge graph 122 and matches the distribution node, and generates (at block 512) reachability probabilities to the target nodes to perform inductive reasoning.

Figure 6:
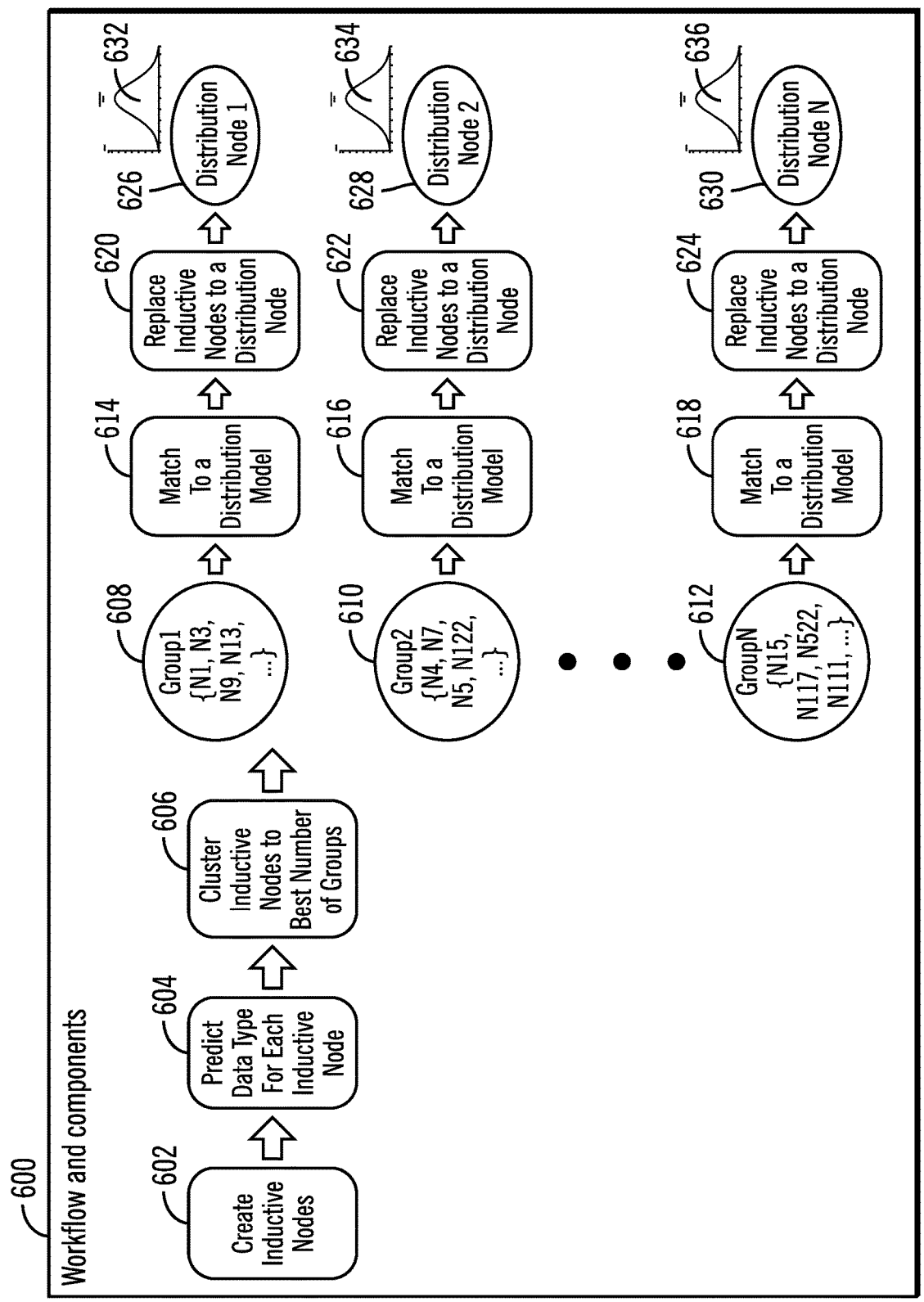
FIG. 6 illustrates a block diagram that shows workflow and components, in accordance with certain embodiments.

FIG. 6 illustrates a block diagram 600 that shows workflow and components, in accordance with certain embodiments.

The knowledge graph management application 104 creates (block 602) inductive nodes, and then predicts (block 604) data types on each inductive node, and then clusters (block 606) inductive nodes to a best or optimal number of groups 608, 610, 612.

The groups 608, 610, 612 are matched to distribution models 614, 616, 618 respectively, and inductive nodes of corresponding groups replaced (blocks 620, 622, 624) to form distribution nodes 626, 628, 630, based on distribution models 632, 634, 636.

Figure 7:
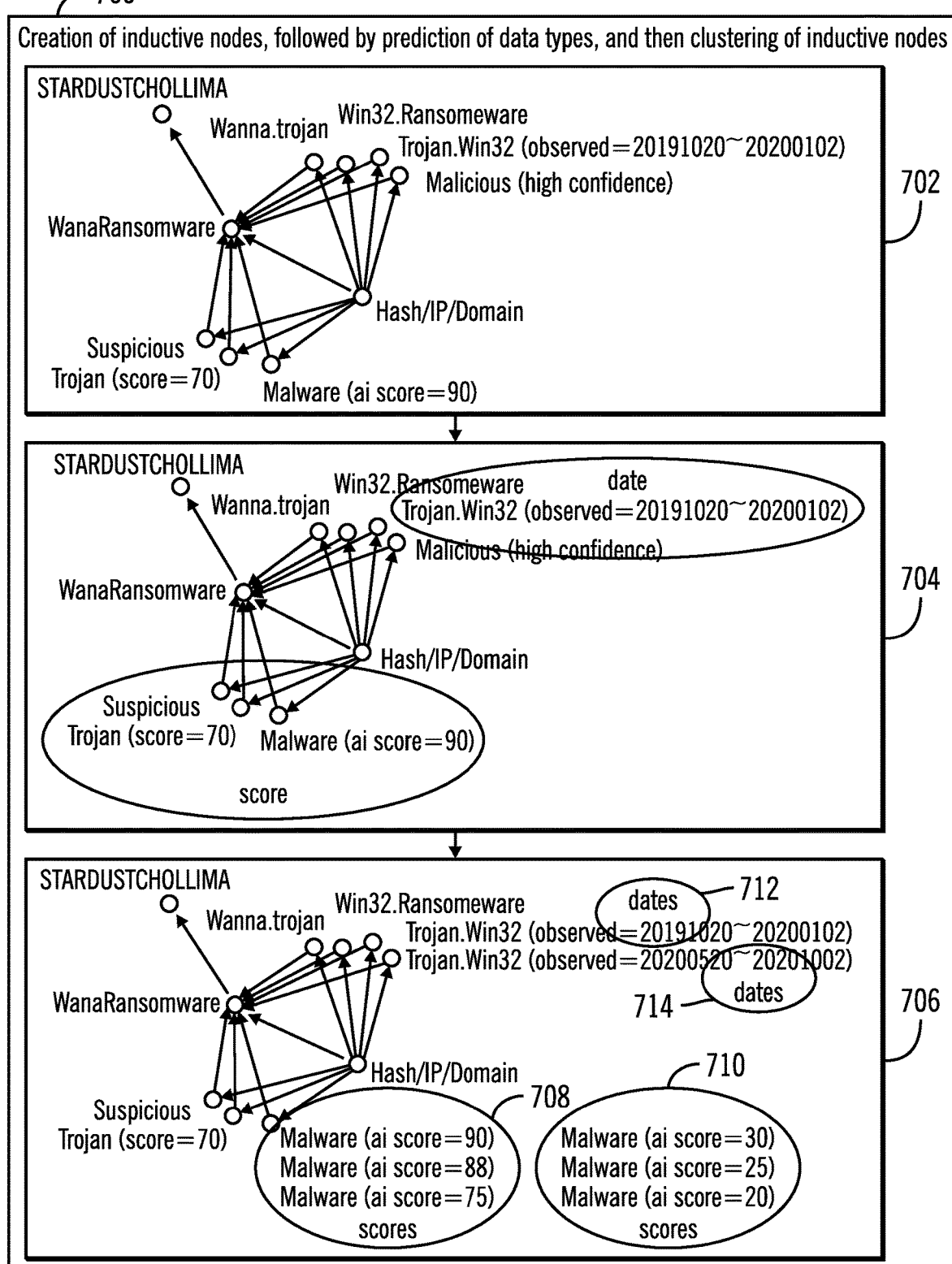
FIG. 7 illustrates a block diagram that shows creation of inductive nodes, followed by prediction of data types, and then clustering of inductive nodes, in accordance with certain embodiments.

FIG. 7 illustrates a block diagram 700 that shows creation of inductive nodes 702, followed by prediction of data types 704, and then clustering of inductive nodes 706, in accordance with certain embodiments. For example, malware clusters are shown via reference numeral 708, 710 and trojan clusters via reference numerals 712, 714, where the malware clusters are based on numeric scores, and the trojan clusters are based on date ranges. Subsequently, distribution nodes are created.

Figure 8:
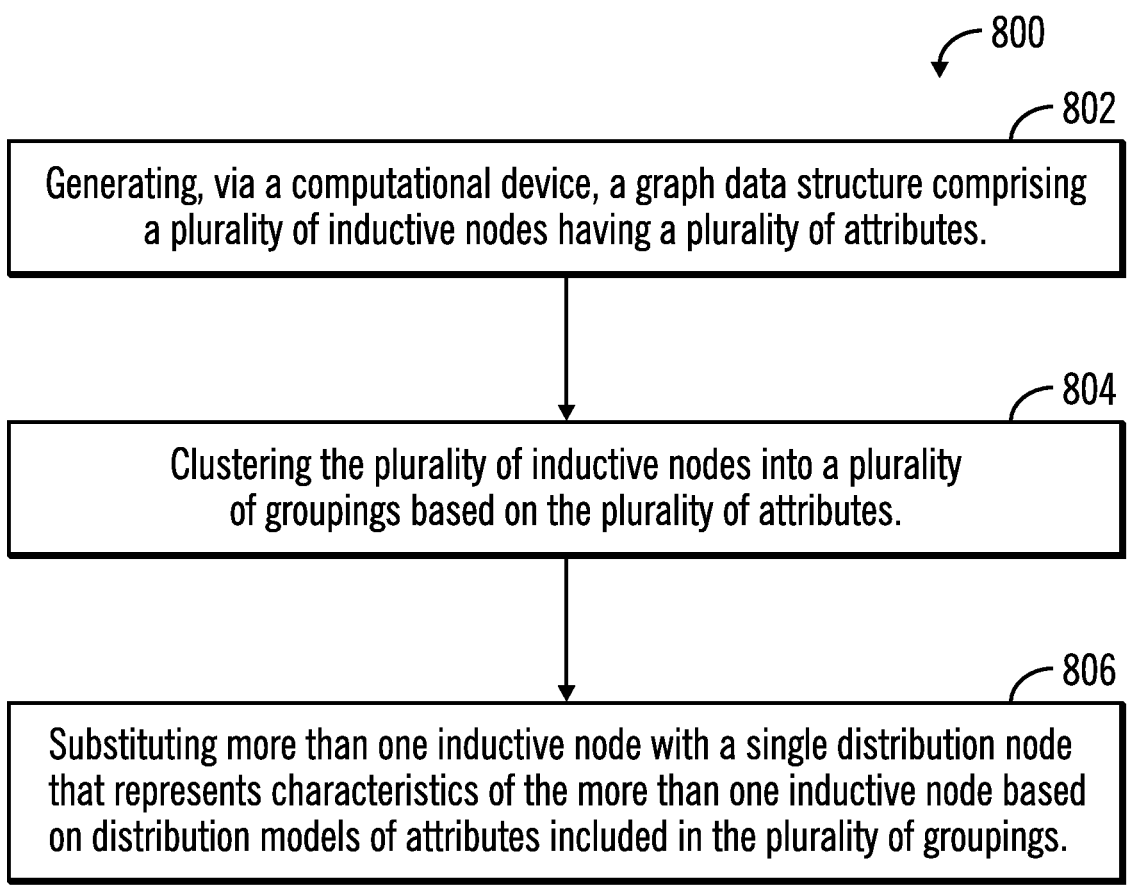
FIG. 8 illustrates a second flowchart that shows operations for the reduction of nodes for a graph-based knowledge system via distribution models of data.

FIG. 8 illustrates a second flowchart 800 that shows operations for the reduction of nodes for a graph-based knowledge system via distribution models of data. The operations shown in FIG. 8 may be performed by the knowledge graph management application 104 that executes in the local computational device 102.

Control starts at block 802 in which a computational device 102 generates a graph data structure 105 comprising a plurality of inductive nodes 108, 110 having a plurality of attributes. From block 802 control proceeds to block 804 in which the plurality of inductive nodes 108, 110 are clustered into a plurality of groupings based on the plurality of attributes.

From block 804 control proceeds to block 806 in which a substitution is made of more than one inductive node with a single distribution node that represents characteristics of the more than one inductive node based on distribution models of attributes included in the plurality of groupings.

Therefore, FIGS. 1-8 illustrate certain embodiments in which a plurality of inductive nodes of a knowledge graph are replaced by a single distribution node to improve the performance of performing inductive reasoning in a knowledge graph.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
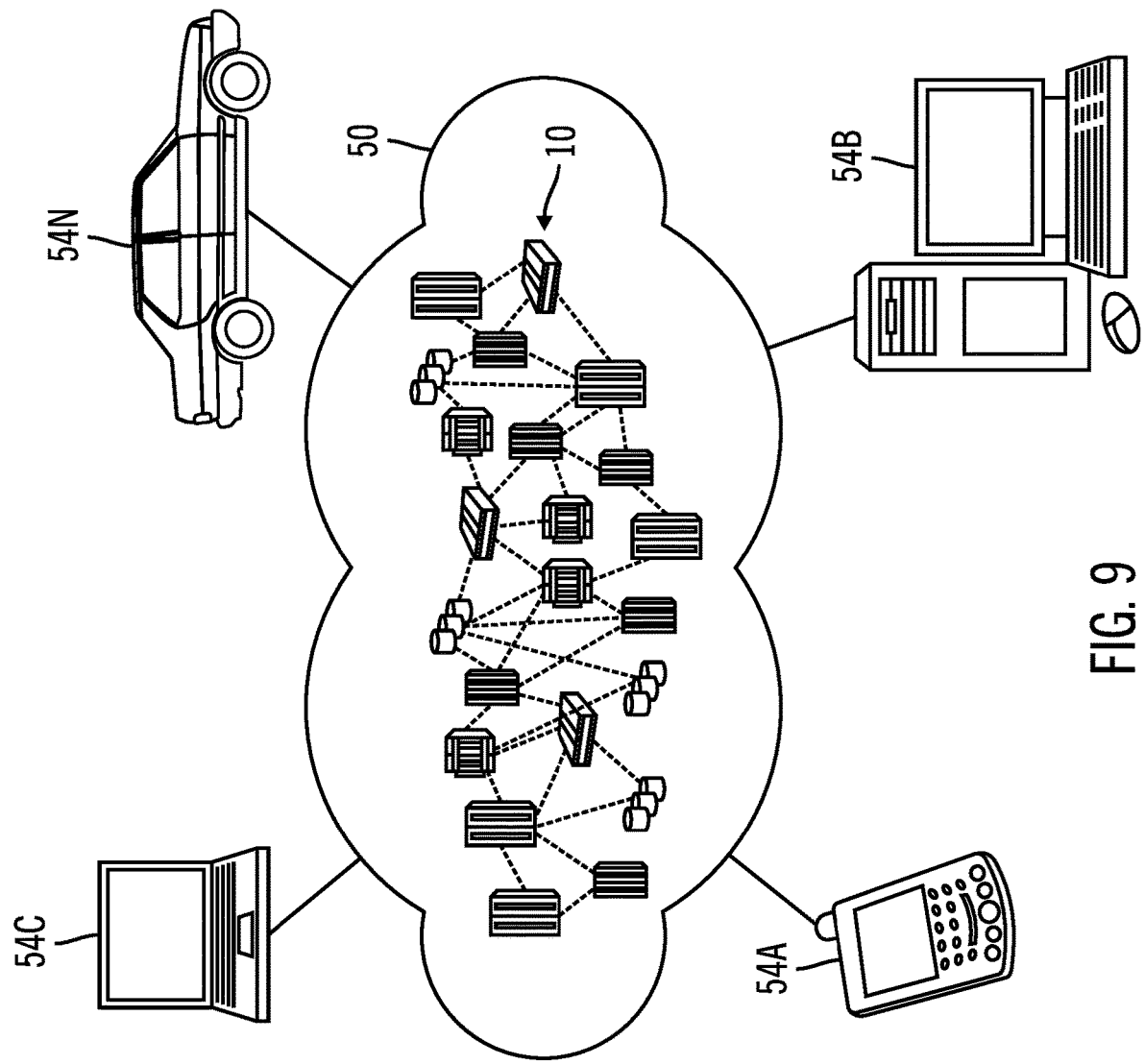
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
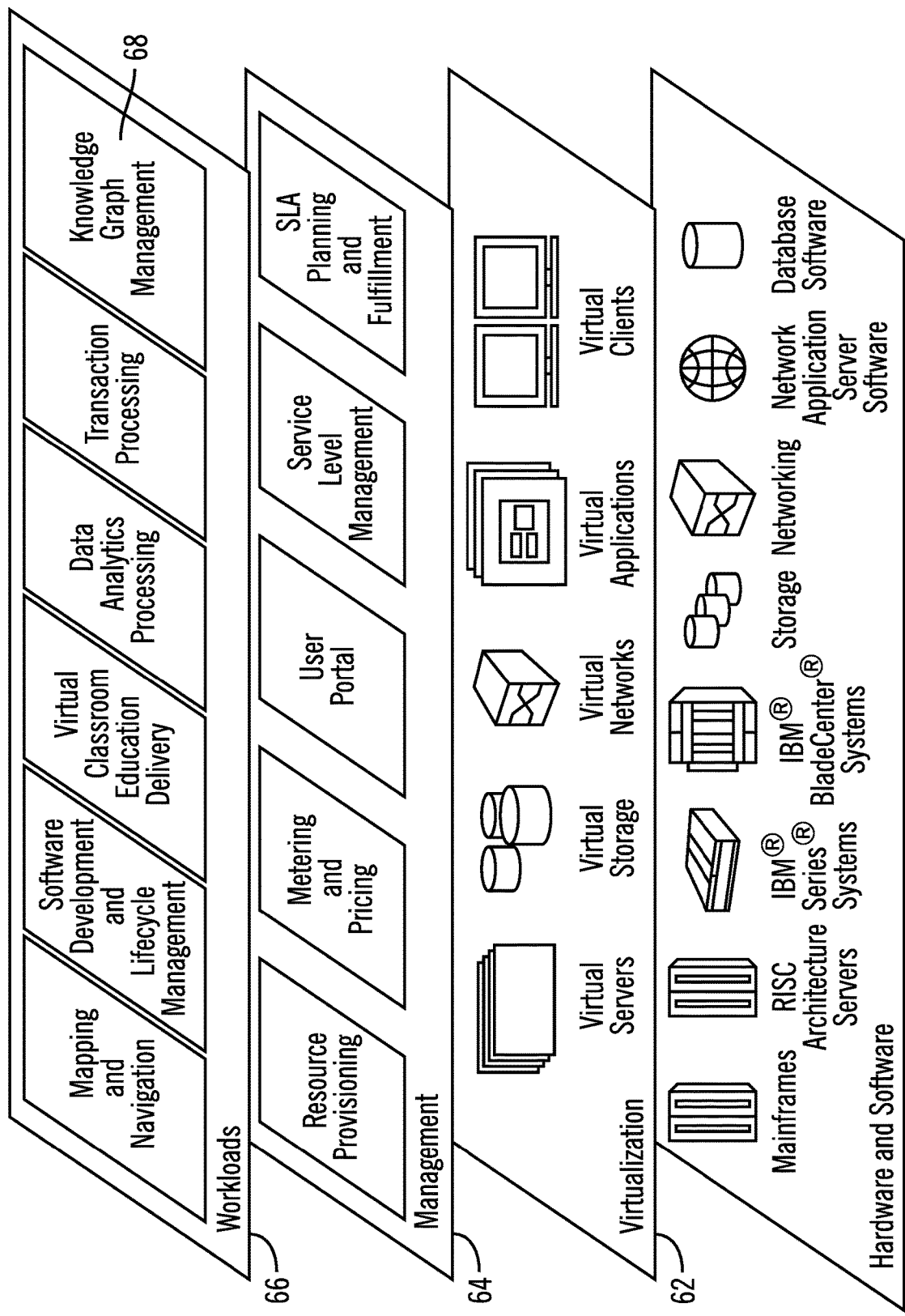
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM Web Sphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and knowledge graph management 68 as shown in FIGS. 1-10.

ADDITIONAL EMBODIMENT DETAILS

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
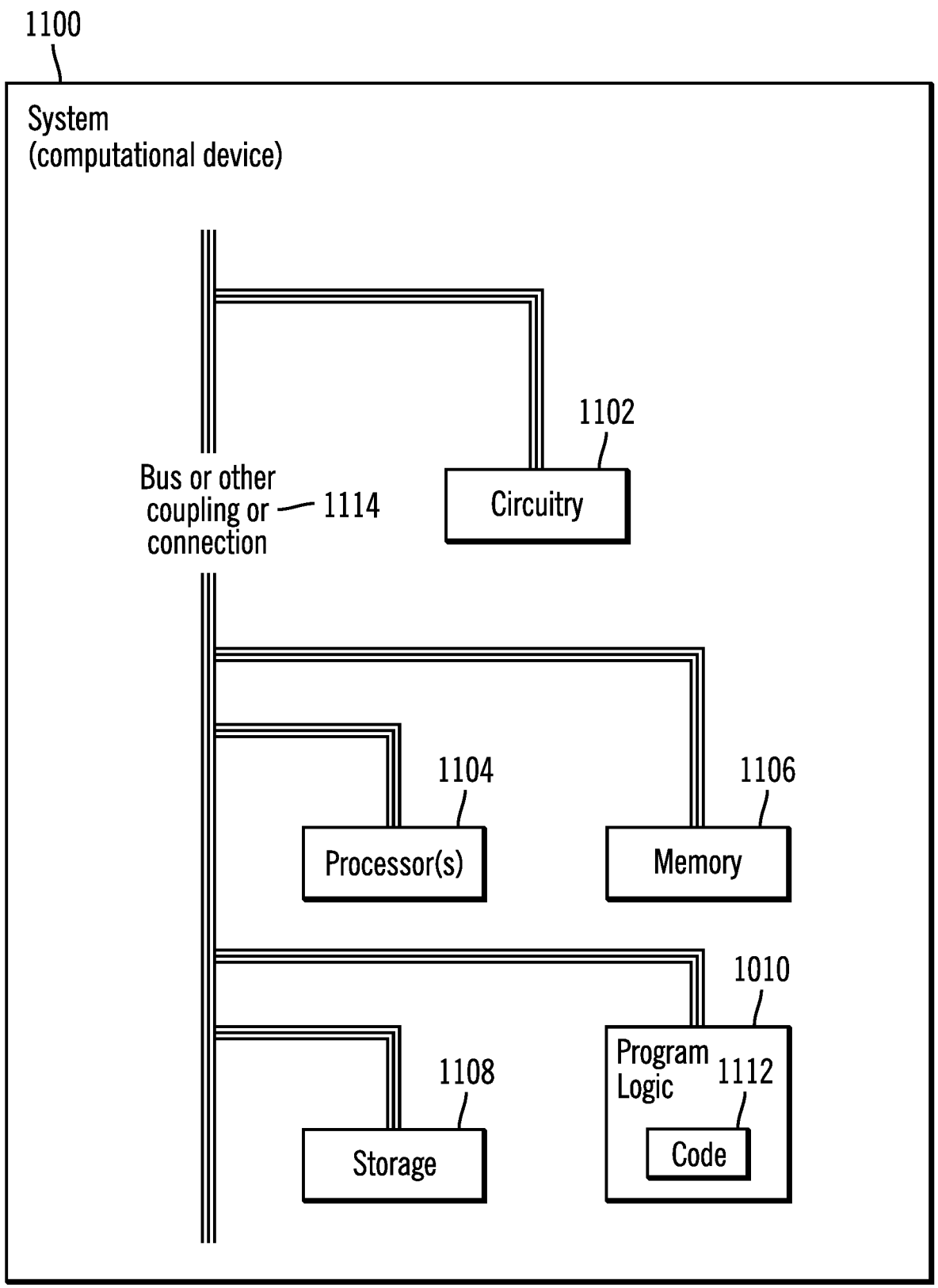
FIG. 11 illustrates a block diagram of a computational system that shows certain elements that may be included in the local computational device and remote computational devices described in FIGS. 1-10, in accordance with certain embodiments.

FIG. 11 illustrates a block diagram that shows certain elements that may be included in the computational device 102 or other computational devices 106, 107 in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for improving processing efficiency of a local computational device in performing inductive reasoning within a graph-based knowledge system, the method comprising:
    generating, via the local computational device, a graph data structure stored in a memory of the local computational device, the graph data structure comprising a plurality of inductive nodes having a plurality of attributes, wherein the plurality of attributes include at least a score-based attribute indicating a likelihood associated with a tag of the inductive node, a date-based attribute indicting a range of dates associated with the tag, and a level-based attribute indicating qualitative labels associated with the tag;
    clustering, by a processor of the local computational device, the plurality of inductive nodes into a plurality of groupings based on the plurality of attributes, wherein a first grouping is based on the score-based attribute, and wherein a second grouping is based on the date-based attribute; and
    substituting, in the memory of the local computational device, more than one inductive node with a single distribution node that represents characteristics of the more than one inductive node based on distribution models of attributes included in the plurality of groupings, to convert the graph data structure to a condensed graph data structure;
    receiving, by the local computational device, a new observation from a remote computational device, wherein tags of the new observation from the remote computation device are in a format that is not known in advance to the graph-based knowledge system in the local computational device; and
    determining, by the local computational device, from the condensed graph data structure which distribution node of a plurality of distribution nodes encompasses attributes of the tags of the new observation received from the remote computational device, via patterns and values ranges of the attributes of the tags of the new observation received from the remote computational device.

2. The method of claim 1, wherein the condensed graph data structure is used to represent knowledge, and wherein prediction from the condensed graph data structure is faster in comparison to prediction from the graph data structure.

3. The method of claim 2, wherein the plurality of attributes include numeric values, and the single distribution node comprises a normal distribution of the numeric values with a computed mean and a standard deviation from the numeric values.

4. The method of claim 2, wherein the plurality of attributes include dates, and the single distribution node corresponds to a range of dates.

5. The method of claim 2, wherein the graph data structure represents knowledge entities in the plurality of inductive nodes.

6. The method of claim 1, the method further comprising:
    traversing, by the processor of the local computational device, the graph data structure with the single distribution node to perform inductive reasoning for the new observation, wherein the substituting of the more than one inductive node with the single distribution node reduces a number of nodes traversed, thereby reducing processor cycles and memory usage compared to traversing the graph data structure without the substituting of the more than one inductive node with the single distribution node.

7. A system with improved processing efficiency in performing inductive reasoning within a graph-based knowledge system, the system comprising:
    a memory; and
    a processor coupled to the memory, wherein the processor performs operations, the operations comprising:
    generating, a graph data structure stored in the memory, the graph data structure comprising a plurality of inductive nodes having a plurality of attributes, wherein the plurality of attributes include at least a score-based attribute indicating a likelihood associated with a tag of the inductive node, a date-based attribute indicting a range of dates associated with the tag, and a level-based attribute indicating qualitative labels associated with the tag;
    clustering the plurality of inductive nodes into a plurality of groupings based on the plurality of attributes, wherein a first grouping is based on the score-based attribute, and wherein a second grouping is based on the date-based attribute; and
    substituting, in the memory, more than one inductive node with a single distribution node that represents characteristics of the more than one inductive node based on distribution models of attributes included in the plurality of groupings used to represent knowledge, to convert the graph data structure to a condensed graph data structure, wherein the system comprises a local computational device;

receiving, by the local computational device, a new observation from a remote computational device, wherein tags of the new observation from the remote computation device are in a format that is not known in advance to the graph-based knowledge system in the local computational device; and determining, by the local computational device, from the condensed graph data structure which distribution node of a plurality of distribution nodes encompasses attributes of the tags of the new observation received from the remote computational device, via patterns and values ranges of the attributes of the tags of the new observation received from the remote computational device.

8. The system of claim 7, wherein the condensed graph data structure is used to represent knowledge, and wherein prediction from the condensed graph data structure is faster in comparison to prediction from the graph data structure.

9. The system of claim 8, wherein the plurality of attributes include numeric values, and the single distribution node comprises a normal distribution of the numeric values with a computed mean and a standard deviation from the numeric values.

10. The system of claim 8, wherein the plurality of attributes include dates, and the single distribution node corresponds to a range of dates.

11. The system of claim 9, wherein the graph data structure represents knowledge entities in the plurality of inductive nodes.

12. The system of claim 7, the operations further comprising:

traversing, by the processor of the local computational device, the graph data structure with the single distribution node to perform inductive reasoning for the new observation, wherein the substituting of the more than one inductive node with the single distribution node reduces a number of nodes traversed, thereby reducing processor cycles and memory usage compared to traversing the graph data structure without the substituting of the more than one inductive node with the single distribution node.

13. A computer program product for improving processing efficiency of a local computational device in performing inductive reasoning within a graph-based knowledge system, the computer program product comprising a computer readable storage medium having computer readable program code embodied therewith, the computer readable program code configured to perform operations, the operations comprising:

generating, via the local computational device, a graph data structure stored in a memory of the local computational device, the graph data structure comprising a plurality of inductive nodes having a plurality of attributes, wherein the plurality of attributes include at least a score-based attribute indicating a likelihood associated with a tag of the inductive node, a date-based attribute indicting a range of dates associated with the tag, and a level-based attribute indicating qualitative labels associated with the tag;

clustering, by a processor of the local computational device, the plurality of inductive nodes into a plurality of groupings based on the plurality of attributes, wherein a first grouping is based on the score-based attribute, and wherein a second grouping is based on the date-based attribute; and substituting, in the memory of the local computational device, more than one inductive node with a single distribution node that represents characteristics of the more than one inductive node based on distribution models of attributes included in the plurality of groupings, to convert the graph data structure to a condensed graph data structure;

receiving, by the local computational device, a new observation from a remote computational device, wherein tags of the new observation from the remote computation device are in a format that is not known in advance to the graph-based knowledge system in the local computational device; and determining, by the local computational device, from the condensed graph data structure which distribution node of a plurality of distribution nodes encompasses attributes of the tags of the new observation received from the remote computational device, via patterns and values ranges of the attributes of the tags of the new observation received from the remote computational device.

14. The computer program product of claim 13, wherein the condensed graph data structure is used to represent knowledge, and wherein prediction from the condensed graph data structure is faster in comparison to prediction from the graph data structure.

15. The computer program product of claim 14, wherein the plurality of attributes include numeric values, and the single distribution node comprises a normal distribution of the numeric values with a computed mean and a standard deviation from the numeric values.

16. The computer program product of claim 14, wherein the plurality of attributes include dates, and the single distribution node corresponds to a range of dates.

17. The computer program product of claim 13, wherein the graph data structure represents knowledge entities in the plurality of inductive nodes.

18. The computer program product of claim 13, the operations further comprising:

traversing, by the processor of the local computational device, the graph data structure with the single distribution node to perform inductive reasoning for the new observation, wherein the substituting of the more than one inductive node with the single distribution node reduces a number of nodes traversed, thereby reducing processor cycles and memory usage compared to traversing the graph data structure without the substituting of the more than one inductive node with the single distribution node.

* * * * *